United States Patent [19]

Wendt

[11] 4,422,180
[45] Dec. 20, 1983

[54] CONTROL SIGNAL TRANSMITTING APPARATUS, PARTICULARLY FOR AIRCRAFT

[75] Inventor: Hans J. Wendt, Buxtehude, Fed. Rep. of Germany

[73] Assignee: Messerschmitt-Bolkow-Blohm Gesellschaft mit beschrankter Haftung, Munich, Fed. Rep. of Germany

[21] Appl. No.: 293,277

[22] Filed: Aug. 17, 1981

[30] Foreign Application Priority Data

Sep. 2, 1980 [DE] Fed. Rep. of Germany ....... 3032918
Mar. 25, 1981 [DE] Fed. Rep. of Germany ....... 3111722

[51] Int. Cl.$^3$ .............................................. H04B 9/00
[52] U.S. Cl. .................... 455/603; 455/612; 455/617; 244/194
[58] Field of Search .................... 455/603, 617, 612; 244/194

[56] References Cited

U.S. PATENT DOCUMENTS 3,708,735  1/1973  Barltrop ........................... 244/194
4,105,900  8/1978  Martin et al. ..................... 244/194

OTHER PUBLICATIONS

R. Cotta "Fiber Optic Flight Control" Military Electronics/Counter Measures vol. 6, No. 4, Apr. 1980, pp. 59–63.
K. Hiramo "Recent Control Systems for Hydropower Plant" Hitachi Review vol. 28, (1979) No. 4 pp. 193–198.

Primary Examiner—John C. Martin
Assistant Examiner—Edward L. Coles
Attorney, Agent, or Firm—W. G. Fasse; D. H. Kane, Jr.

[57] ABSTRACT

A control system for controlling, for example, the operation of an aircraft or any other system requiring a flow of data back and forth between controlling and controlled units of the system, comprises a passive, multiply intermeshed conductor network (20, 24) of light conductors (11, 12). This network transmits control signals in the form of digital light signals from a control signal source, such as a control stick (9) in the cockpit of an aircraft or spacecraft, to respective controlled servo-units (14). The transmission system includes signal processors (10) including mixers (15) and information devices (16, 17, 18) interposed between the control signal source and the network (24) which is connected to the addressable controlled units, e.g., servo-units. The system is powered by a power supply device comprising several energy sources which may be switched on selectively are required. Such energy sources include the propulsion plant, for example, of an aircraft, an auxiliary turbine (112), a slip wind turbine (120) and an electric battery (128). Each energy source is connected to a measuring and switching unit (106, 115, 124, 131) through redundant transmission units (110) three of which are connected in parallel to one another and to the network (24). The transmission units (110) are further connected through the network (24) to a testing device (135) for monitoring and controlling the connected units or components.

21 Claims, 14 Drawing Figures

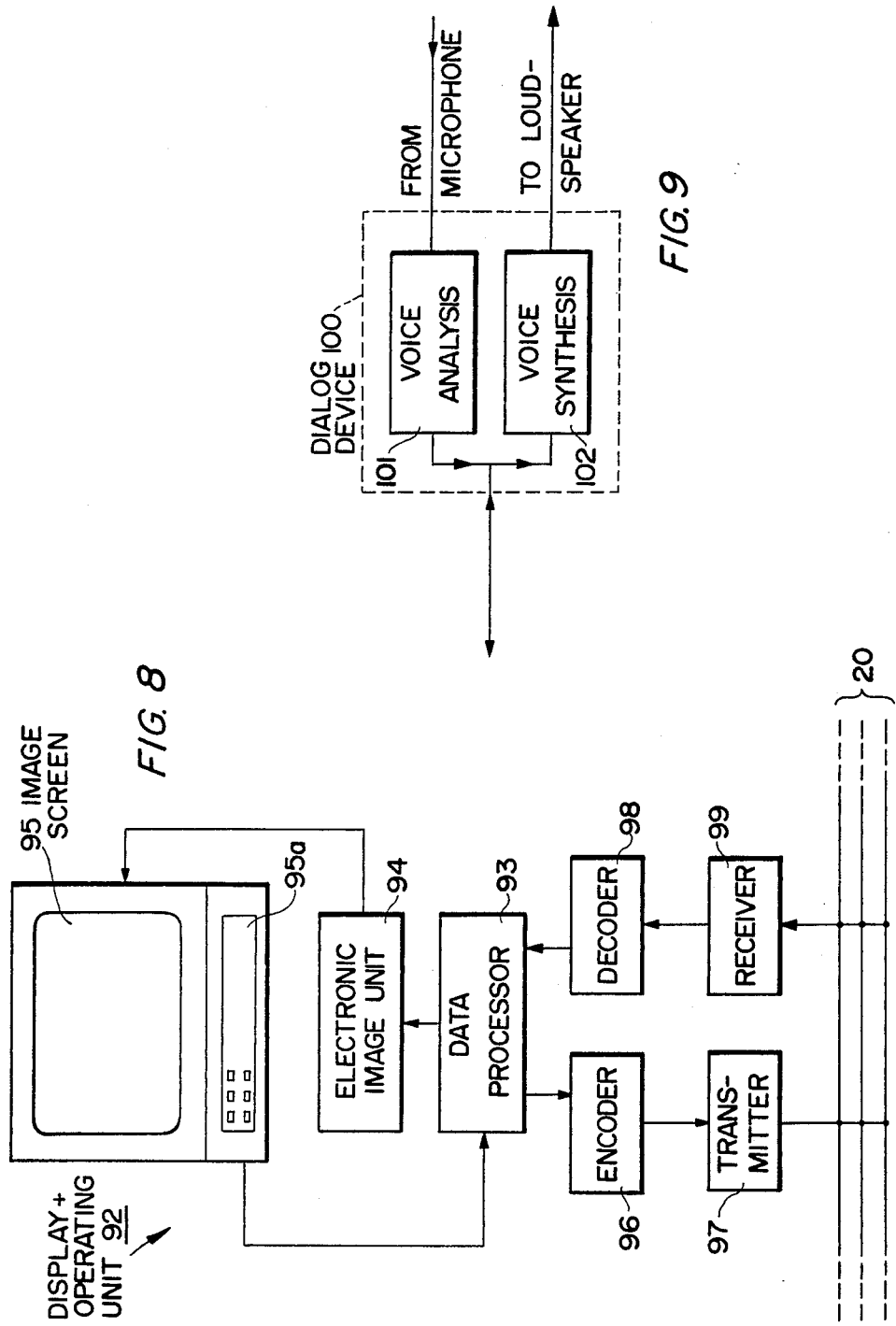

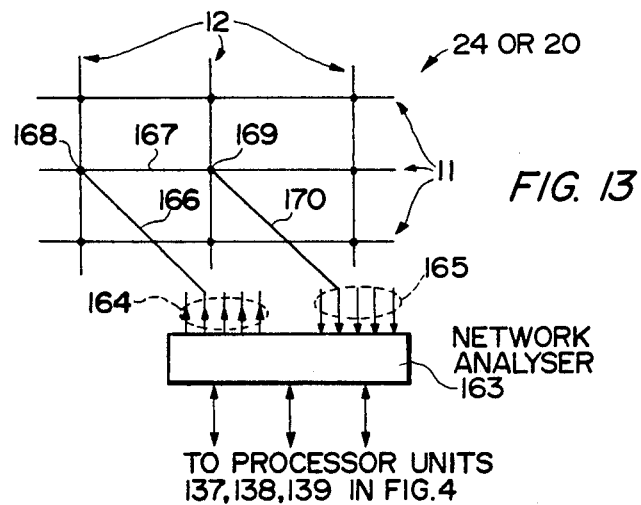
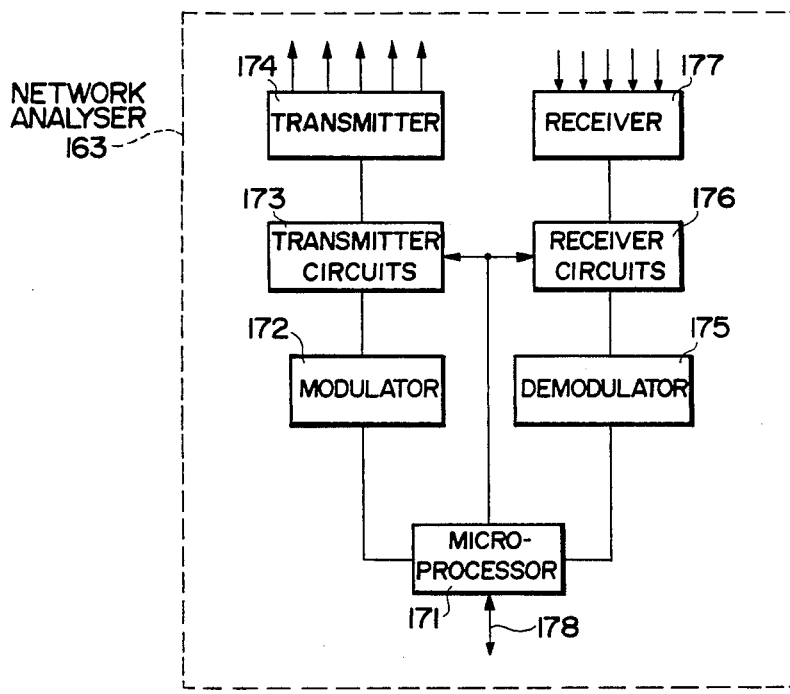

CONTROL SIGNAL TRANSMITTING APPARATUS, PARTICULARLY FOR AIRCRAFT

CROSS-REFERENCE TO RELATED APPLICATIONS

The present invention relates to corresponding German Patent applications: No. P 30 32 918.1, filed on Sept. 2, 1980 in the Federal Republic of Germany; and No. P 31 11 722.8, filed on Mar. 25, 1981 in the Federal Republic of Germany. The priority of said German filing dates is hereby expressly claimed.

BACKGROUND OF THE INVENTION

The invention relates to a control signal transmitting apparatus especially for aircraft. Such control signals are to be transmitted to the control surfaces, for example, the flaps of the elevator assembly, the rudder assembly, and so forth. The transmission is to be accomplished by a passive conductor system.

It is generally known that control signals in an aircraft are transmitted in response to control movements made by the pilot, for example to control the rudder, by mechanical means such as cable pulls, linking rods, rotational shafts, or combinations of such mechanical means. Depending on the type of application, these devices are supplemented by hydraulic or electrical drive means. It is further known in connection with large volume aircraft to employ servo-control systems. Due to the mechanical coupling means interposed between certain rudders in such control systems the operational patterns are positively or rigidly determined. For example, the following operational patterns are so determined: operation of the elevator assembly takes place always symmetrically, operation of the ailerons takes place always in a non-sysmmetrical manner, operation of the landing flaps or air brake flaps always takes place symmetrically.

These fixed operational patterns have the disadvantage that, for example, upon failure of a certain rudder, the remaining still operational rudder might possibly not be available for use in re-establishing the maneuverability. If military considerations are taken into account the above mentioned mechanical control systems have a further disadvantage resulting from their vulnerability. Thus, for these purposes electrical servo-control systems have been used in which the transmission of control signals takes place through passive conductors such as coaxial cables. In such a system it is possible to provide the individual operational circuits including the cables leading to the individual adjustment members in a redundant manner, for example in quadruplicate. Thus, such an operational circuit remains, for example, still operational even if three of the respective cables have failed, for example, as a result of combat action. However, the provision of redundant signal transmitting circuit means has, among others, the following weak points. Such systems are sensitive to electro-magnetic disturbing fields such as lightning impact, short circuits and the like. An intermeshed cable network cannot be realized without active elements at the nodal points of the network due to transit time effects and reflection effects. Further, due to the just mentioned effects, the wiring may be carried out in practice only in the form of function related wiring strands. This means that, for example, in a quadruplicate redundancy systemn four cables are required for each adjustment member to be controlled. Additionally, this type of wiring results in a substantial cable weight if cables with a low damping coefficient are used.

According to the magazine "Electronik Praxis" (Electronic Practice), Vol. 11, pg. 34, 1979, it is known to use light conductors for the assembly of data bus systems, for example, on board ships or aircraft or for controlling industrial processes. In a narrower sense the term "data bus" means a conductor for transmitting or relaying of information to which all subscribers are connected. According to the above article, such systems may be constructed as so-called radial or star-bus or as a T-bus. In a radial or star-bus system all connecting conductors converge in a so-called star-coupling member. In a T-bus system each subscriber is connected to the data-bus by a T-coupling member. The light conductor technique has substantial advantages with regard to its use in the control systems of an aircraft, for example, with regard to the weight and reliability. Nevertheless, the radial or star-bus concept as well as the T-bus concept have the disadvantage that each subscriber or rather, each controlled member is connected to the remainder of the system through but one conductor. It follows, that upon failure of such single conductor the functions of the respective subscriber or controlled member must also fail. In connection with the control of an aircraft this would mean that upon failure of a corresponding conductor, for example, due to a localized damage as a result of the failure of other components, possibly a vital control function could be eliminated.

OBJECTS OF THE INVENTION

In view of the above it is the aim of the invention to achieve the following objects singly or in combination:

to provide an arrangement, especially suitable for the control of aircraft, for transmitting of control signals without any malfunctions due to transit time effects, reflections, and electro-magnetic disturbing fields;

to provide a control signal transmission system which operates passively as an intermeshed conductor network which makes it possible to perform new, preprogrammed control steps or control functions in response to the failure of control elements;

to provide a power supply system the reliability of which is compatible with the reliability of the other elements in the control system to be powered by the power supply system;

to provide a light conductor system for the control of an aircraft which has a high degree of freedom against interference from any possible extraneous light influences; and to provide a control system especially suitable for the control of aircrafts which has a high reliability factor.

SUMMARY OF THE INVENTION

According to the invention there is provided a system for the transmission of control signals especially to the control surfaces in an aircraft by a passive conductor system which is characterized by a conductor system comprising a network including repeatedly intermeshed light conductors. The system further includes control members for producing of control instructions in the form of digital light signals. The control members are connected to the light conductor network for transmitting the control instruction signals through signal processors including signal mixers and information systems. Servo-mechanisms are connected to the outputs of the light conductor intermeshed network, whereby the servo-mechanisms are addressable and controllable for effecting the respective control function.

By means of the system according to the invention a substantially increased safety factor has been realized as compared to mechanical, hydraulic, or electrical systems or any combination of such prior art systems. Another advantage of the invention is seen in that it is now possible for the controlled surfaces to perform new types of combinations of excursions or deflections in certain dangerous situations. Thus, even if a rudder should fail, the maneuverability of the aircraft is retained.

According to the invention the present control system is provided with its own energy supply or power supply which comprises a measuring and switching unit which in turn is connected through three transmission units arranged in parallel to the intermeshed network and through the network with a testing unit. This feature of the invention has the advantage that the power supply to the control system has been greatlyimproved as far as the degree of reliability is concerned. Thus, the degree of reliability of the power supply system corresponds to the degree of reliability of the remainder of the system which is powered by the power supply according to the invention.

Further advantages are achieved by the features of the dependent claims according to the invention.

BRIEF FIGURE DESCRIPTION

In order that the invention may be clearly understood, it will now be described, by way of example, with reference to the accompanying drawings, wherein:

FIG. 8 is a display and operating unit including a control keyboard;

FIG. 9 shows a block circuit diagram of a dialog device;

FIG. 13 illustrates a network analyzer including a portion of a network; and

FIG. 14 shows a block circuit diagram of the internal components of a network analyzer as illustrated in FIG. 13.

DETAILED DESCRIPTION OF PREFERRED EXAMPLE EMBODIMENTS AND OF THE BEST MODE OF THE INVENTION

Figure 1:
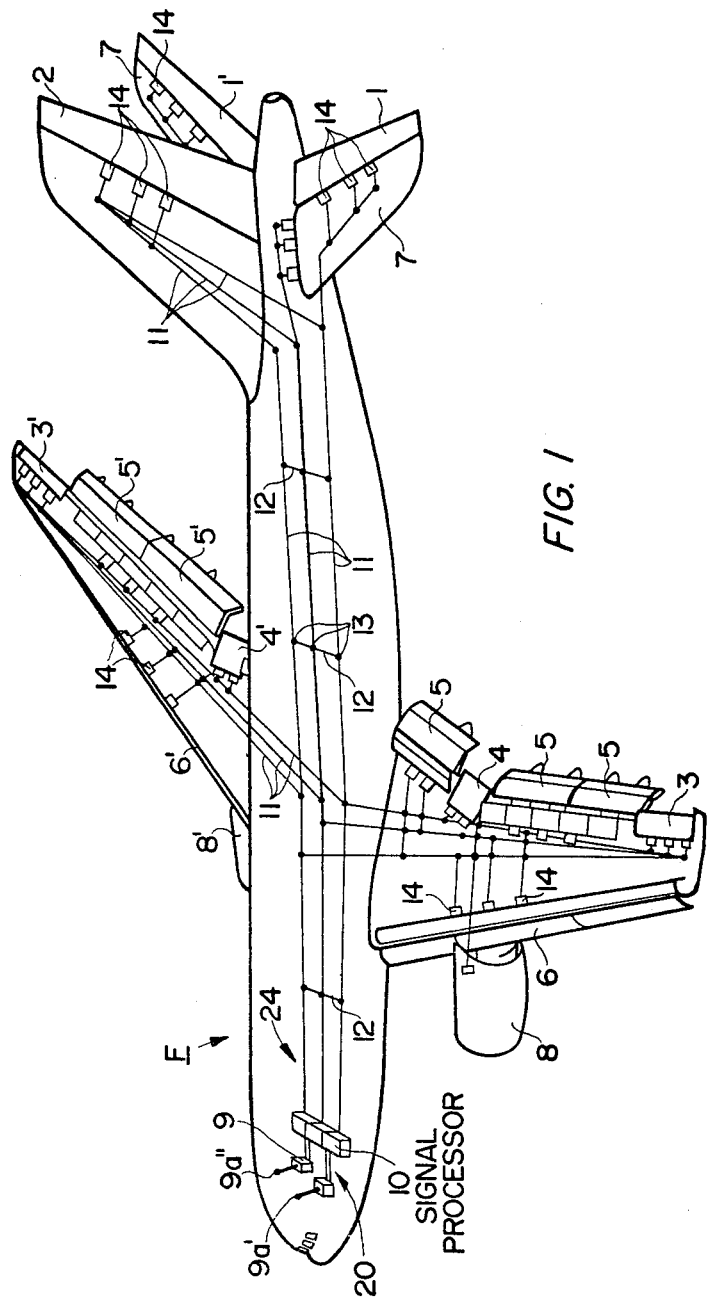
FIG. 1 is a somewhat schematic yet perspective overview of a system according to the invention as installed in an aircraft.

FIG. 1 shows an over-view of the arrangement for transmitting of control signals in an aircraft F. The aicraft F comprises the conventional control surfaces including two elevator assemblies 1, 1', a rudder assembly 2, two slow speed ailerons or wing flaps 3, 3', two high speed ailerons or wing flaps 4, 4', landing flaps or air brakes 5, 5' leading edge flaps 6, 6' and a tail plane or horizontal stabilizer 7. The aircraft further comprises among other conventional components the propulsion plants or engines 8, 8', as well as the control organs 9, whereby the schematic illustration indicates the control sticks 9a', 9a'' and the foot pedals not shown forming a control input source.

Figure 2:
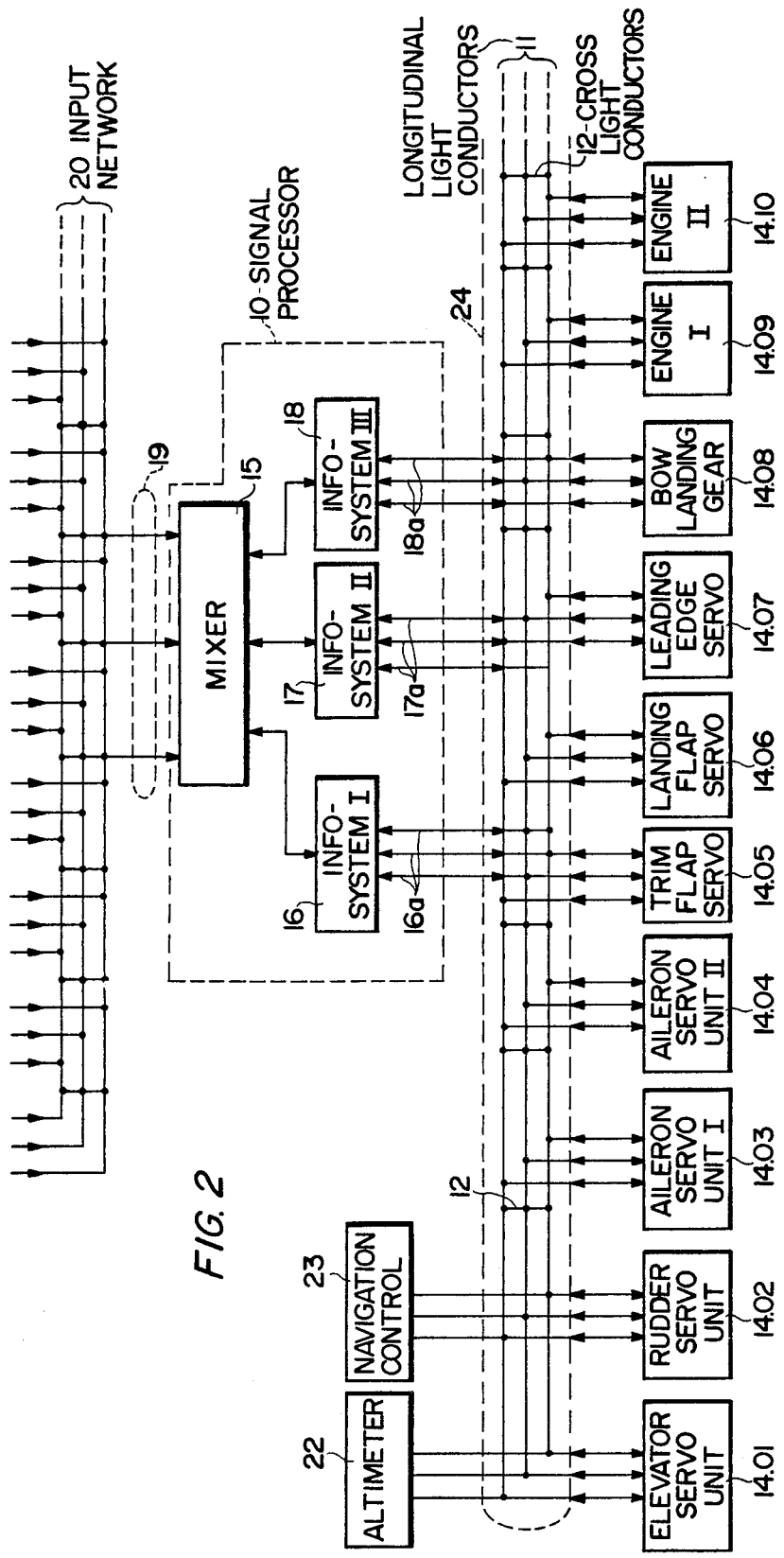
FIG. 2 illustrates a block circuit arrangement of a main control circuit.

As also shown in FIG. 2, the conductor system for transmitting the control signals comprises primarily several signal processors 10 and repeatedly intermeshed networks 20, 24 comprising light conductors including longitudinal conductors 11 and cross conductors 12 forming a multitude of passive closed circuit paths intermeshed with one another so that controlling signals can pass from the control organs 9 to a controlled unit even if some of the circuit paths should fail. The light conductor network 20 is operatively connected between the control input source and the signal processors 10. The light conductor network 24 is operatively connected between the processors 10 and the addressable servo-units 14 forming controlled units. The nodal points 13 comprise branching means of conventional construction, for example, in the form of radial coupling members or T-coupling members for forming said repeatedly or multiply intermeshed network. The control members 9 are constructed in such a manner that they provide a digital light signal corresponding to the control instruction. The servo-units 14 connected to the periphery of the network 24 comprise means for converting the incoming light signals into a control motion. Additionally, the servo-units 14 comprise means for sensing the instantaneous position, for example, of a rudder, and for producing a corresponding light signal which is supplied to the longitudinal conductors 11.

The data transmission between the signal processors 10 and the peripheral devices such as the servo-units 14 connected to the longitudinal light conductors 11 is performed in a cyclic manner. Stated differently, the signal processors 10 supply information signals, for example to the servo-units 14 which signals are addressed in accordance with a fixed interrogation sequence. The servo-units 14 in turn respond to these signals in accordance with addressed information signals. The data traffic that takes place in this connection is defined in the form of so-called telegrams having a fixed word length.

These telegrams are modulated by means of a digital frequency modulation onto a carrier frequency, whereby the light signal exhibits an amplitude modulation corresponding to the carrier frequency. This feature assures a very large safety against malfunctions that may otherwise be caused by any possible extraneous stray light input. Due to the intermeshing it is assured that a signal may reach the addressed servo-units 14 from the signal processors 10 via numerous conductor connections whereby the reliability of the system is further increased. The illustrated system has a triple redundancy which is achieved by arranging the longitudinal conductors 3 and the respective cross conductors 12 in triplicate for each rudder, control surface or the like and by providing three servo-units 14 accordingly. Thus, three of these conductors 11, 12 are arranged in the fuselage, in each wing, and in the tail units. The signal processors 10 comprise the main control circuit for the entire arrangement. These signal processors 10 are also provided in triplicate for increasing the reliability.

FIG. 2 shows a circuit arrangement of one of the signal processors 10 comprising primarily or substantially a mixer 15 and three information handling means 16, 17, 18. The mixer 15 is connected by means of triple light conductors 19 to an intermeshed input network 20 comprising light conductors. Each of the triple ouputs of the mixers 15 is connected with its respective information unit 16, 17, or 18. Each unit 16 to 18 comprises further three connecting light conductors 16a, 17a, and 18a. These connecting light conductors are respectively connected to the network 24 comprising the longitudinal conductors 11 and the cross conductors 12.

The mixer 15 serves for the purpose of processing the digital light signals coming, for example, from the control stick. The processing of these signals takes place in such a manner that further informations may be taken logically into account and may be passed on to the information means 16, 17 and 18.

For example, if the mixer receives a signal which corresponds to a given rated flight altitude, and a further signal from an altimeter 22 representing the actual flight altitude, the mixer 15 will then produce a difference signal for adjusting to the rated flight altitude. Such difference signal is supplied to the network 24 through the information handling means 16, 18. These control signals referred to as telegrams are addressed, in the case of the just given example of a difference altitude signal, to the servo-unit 14.01 of the elevator assembly, whereby the telegram is transformed into a respective excursion or angular movement of the rudder 1. Thus, the aircraft is returned to the rated flight altitude without any participation by the pilot. In the same manner it is possible for the mixer 15 to compare actual course values provided by the navigation equipment 23 with predetermined rated course values. The respective difference signal is transformed into a control instruction or telegram which is addressed to the servo-unit 14.02 for the rudder assembly 2 and to the servo-units 14.03 and 14.04 for the ailerons or wing flaps 3, 3'. The transmission of this control instruction to the respective servo-units is also accomplished through the information means 16, 17 and 18 and through the conductor network 24. The respective servo-units respond to this control instruction or telegram by a respective angular movement by means of which the necessary course correction is accomplished.

FIG. 8, to be described in more detail below, shows a display and operating unit 92 which is connected to the mixer 15 through the input network 20 to receive the respective signals and to display these signals, for example, by a graphic illustration of the rated and actual values, whereby conventional symbols may be used for this purpose. If the system is switched over to manual operation, there is no rated-actual value comparing by the mixer and the incoming control instructions are supplied through the input network 20 directly in the form of respective telegrams to the corresponding servo-units. All control instruction providing means are connected to the input network 20. These control instruction input means 9 include such items as the control stick of the pilot, the foot pedals also operated by the pilot, a trimming wheel, and so forth. As mentioned, the connection is accomplished by light conductors embodied in a triplicate redundant fashion. During the just described operation sequences it is the purpose of the information means 16 to 18 primarily to control the flow of data entering and exiting from the mixing unit 15 in accordance with a predetermined clock sequence. It is the further purpose of the information means 16 to 18 to provide the instruction or interrogation telegrams with the respective addresses.

In the present text the term "optical" and the term "electronic" will be combined as a new term "optronic or optronical".

Figure 3:
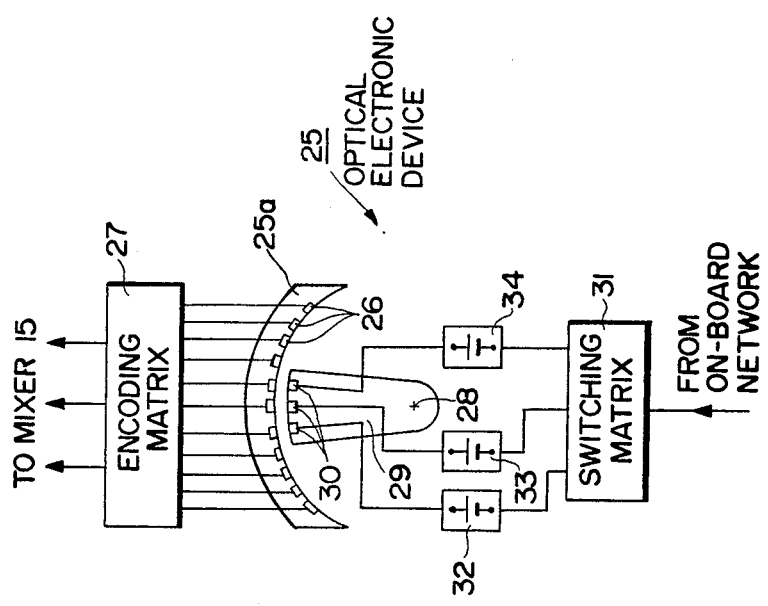
FIG. 3 illustrates an optical system for sensing the instantaneous position of a control member such as the control stick in an aircraft.

FIG. 3 illustrates a block circuit diagram of an optronic device 25 for sensing the instantaneous position or positions of the control stick 9a and for converting these sensed positions into respective electrical signals so that the optronic device 25 functions as a signal generator. The optronic device 25 comprises substantially a curved fixed member 25a carrying on its inner side a set of light sensitive diodes 26. The outputs of these light sensitive diodes 26 are respectively connected to the input of an encoding matrix 27. A sector or segment shaped member 29 is rotatable about the axis 28 so that the rotatable member 29 is located opposite the fixed member 25a on the inwardly facing side thereof. The rotatable member 29 is arranged in such a manner that the journal axis 28 coincides with the center of curvature of the inner contour of the fixed member 25a. Further, the range of rotation of the rotatable member 29 is such that in any position of the member 29 an arcuate gap is formed between the stationary member 25a and the rotatable member 29 and so that the radius of curvature for the gap also has its origin in the journal axis 28. Light emitter diodes 30 are arranged in the arcuate outwardly facing surface of the rotatable member 29 in such a manner that the light emitted by these diodes 30 is directly received by the stationary diodes 26. The light emitter diodes 30 are operatively connected to a switching matrix 31 which is powered by the airborne power supply means available on board. However, three buffer batteries 32, 33 and 34 are provided. The switching matrix 31 provides a given electrical impulse pattern, whereby the diodes 30 emit predetermined digital light impulses.

The rotatable or movable member 29 is connected with the control stick 9a' in such a manner that the member 29 follows the movements of the control stick in a fixed relationship. Thus, the receiver diodes 26 receive a light signal which represents the instantaneous position of the control stick 9a. This signal is transformed by the encoding matrix 27 into a digital light signal which is continuously interrogated by the mixer 15. If the airborne power supply for the diodes should fail, the respective energy is supplied to the diodes by the buffer batteries 32 to 34.

The signal generator just described is the more precise the more diodes are installed per angular unit of length. An increase in the resolution or precision is further possible in that the movable member 29 is driven by translatory gear of known construction. By using a logic circuit arrangement it is possible to make sure that the reading by the encoding matrix 27 is unambiguous even if one of the three light emitter diodes 30 should fail during operation. According to the invention any one or all of the other control members such as the pedals, the trimming wheel and so forth may be equipped for cooperation with an optronic device. Further, this device may, for example, be modified by exchanging the position of the light emitter diodes with the light receiving diodes.

Figure 4:
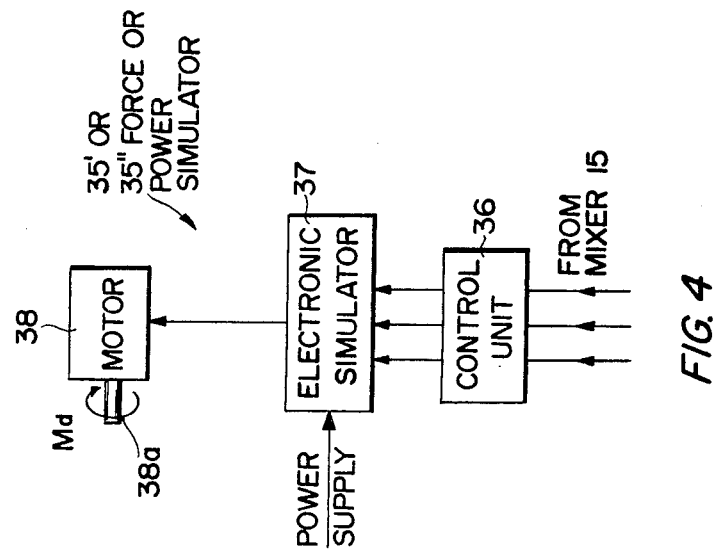
FIG. 4 is a block cicuit diagram of a power simulator.

FIG. 4 shows a block circuit diagram of a force or power simulator 35. Such devices for the simulation of the rudder forces are known as such and are usually based on quite complicated mechanical gear systems. The force or power simulator 35 according to the invention operates electromagnetically and it is controlled by or through light conductors. The force simulator 35 comprises substantially a control unit 36, an electronic simulator unit 37 and an electric motor 38. The above described mixer 15 supplies through the light conductor to the force simulator 35 signals addressed to the force simulator and corresponding to the flight speed. The control unit 36 receives these signals selectively and transmits or passes on these signals in the form of electrical digital signals to be received by the electronic simulator unit 37. This unit 37 supplies a certain electrical power to the motor 38. The supplied power depends on a fixed, preprogrammed function equation which represents the particular aircraft type. The power supplied to the motor 38 depends further on the speed of the aircraft as well as on the instantaneous rudder excursion. This power provides at the instant when no rudder movement takes place, a torque moment $M_d$ through the shaft 38a. The torque moment is directly effective, for example, on the control stick 9a, in such a manner that the pilot may sense a respective force. This force corresponds in a sensible manner to the rudder forces. The direction of the torque moment $M_d$ is reversed in accordance with the program stored in the memory of the simulator unit 37 when the control column 9a passes through a neutral or zero position. The signals supplied to the mixer 15 and corresponding to the flight speeds are derived, for example, from a measuring taken by means of a Pitot tube not shown and supplied through an analog-to-digital converter. The mixer feeds these digital light signals into the input network 20 by means of an addressable control unit.

Figure 5:
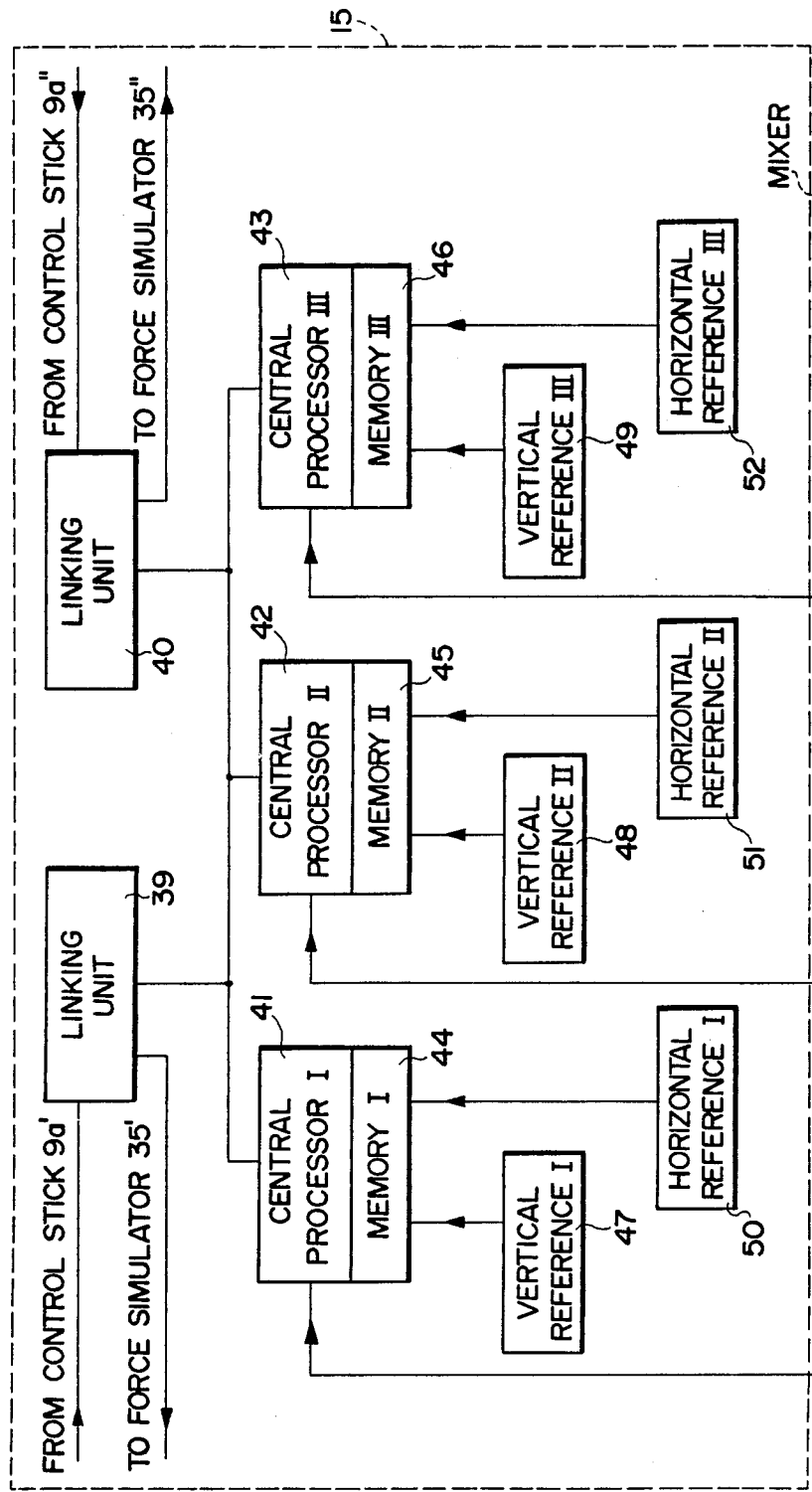
FIG. 5 is a circuit arrangement of a mixing unit.

FIG. 5 shows the inner circuit arrangement of the above mentioned mixer 5 having two connecting or linking units 39 and 40. Linking unit 39 is connected with its input to the control stick 9a' and linking unit 40 is connected with its input to the control stick 9a''. Both linking units cooperate with three central data processor units 41, 42, and 43. Each of these data processing units comprises its own memory 44, 45, and 46 respectively. The mixer 15 further comprises for each organ capable of delivering a control instruction or telegram, a respective connecting means not shown for simplicity's sake. For example, each linking unit would be connected to the respective stick through a connecting means, for example, an amplifier. Each memory of the processors comprises a vertical reference input 47, 48, and 49 respectively, as well as its own horizontal reference signal input 50, 51, and 52 respectively. The interconnection between the linking units and the control sticks as well as the force simulators 35' and 35'' with the respective linking unit is accomplished by means of light conductors. The just mentioned internal functional units of the mixer 15 are interconnected by electrical conductors as shown in FIG. 5. The connection of the mixer with the information handling means 16 to 18 is also accomplished by electrical conductors.

For example, the encoded signals coming from the control stick 9a' are fed into the linking unit 39 comprising substantially the required amplifiers and code transformers for amplifying and code transforming these signals whereupon these signals are supplied through the internal data-bus of the mixer to the central processor units 41, 42, and 43. Referring further to FIG. 5, a circuit arrangement which determines the priority within the connecting units makes sure that the signals from the control stick 9a' have priority until the actuation of the control stick 9a'' establishes the priority for the signals processed through the linking units 40, whereupon the latter takes over the control. The memories 44, 45, and 46 store the reference signals received from the reference generators 47 to 49 and 50 to 52. These signals or data correspond to the actual position or rather attitude of the aircraft and are compared in the processor units 41 to 43 with rated attitude signals stored in the respective memories. In this comparing operation those data are recognized as being correct which are present in the majority of the processor units 41 to 43. The processor unit, any of the three units, displaying a deviating information is recognized as providing an erroneous information and the respective processor unit is blocked through the internal data-bus of the mixer 15. This blocking is accomplished by means of a special error code signal. The just described processor units 41 to 44 also perform the operations which are required for the above mentioned automatic piloting of the aircraft. A processor suitable for these purposes is known under the model number PDP 11/70 manufactured by Digital Equipment GmbH, 8000 München 40, Germany. As shown in FIG. 1 the entire system comprises three signal processors 10 and accordingly three mixers 15, whereby in each instance the signal processor model number PDP 11/70 is suitable. This redundancy correspondingly increases the reliability of the system.

Figure 6:
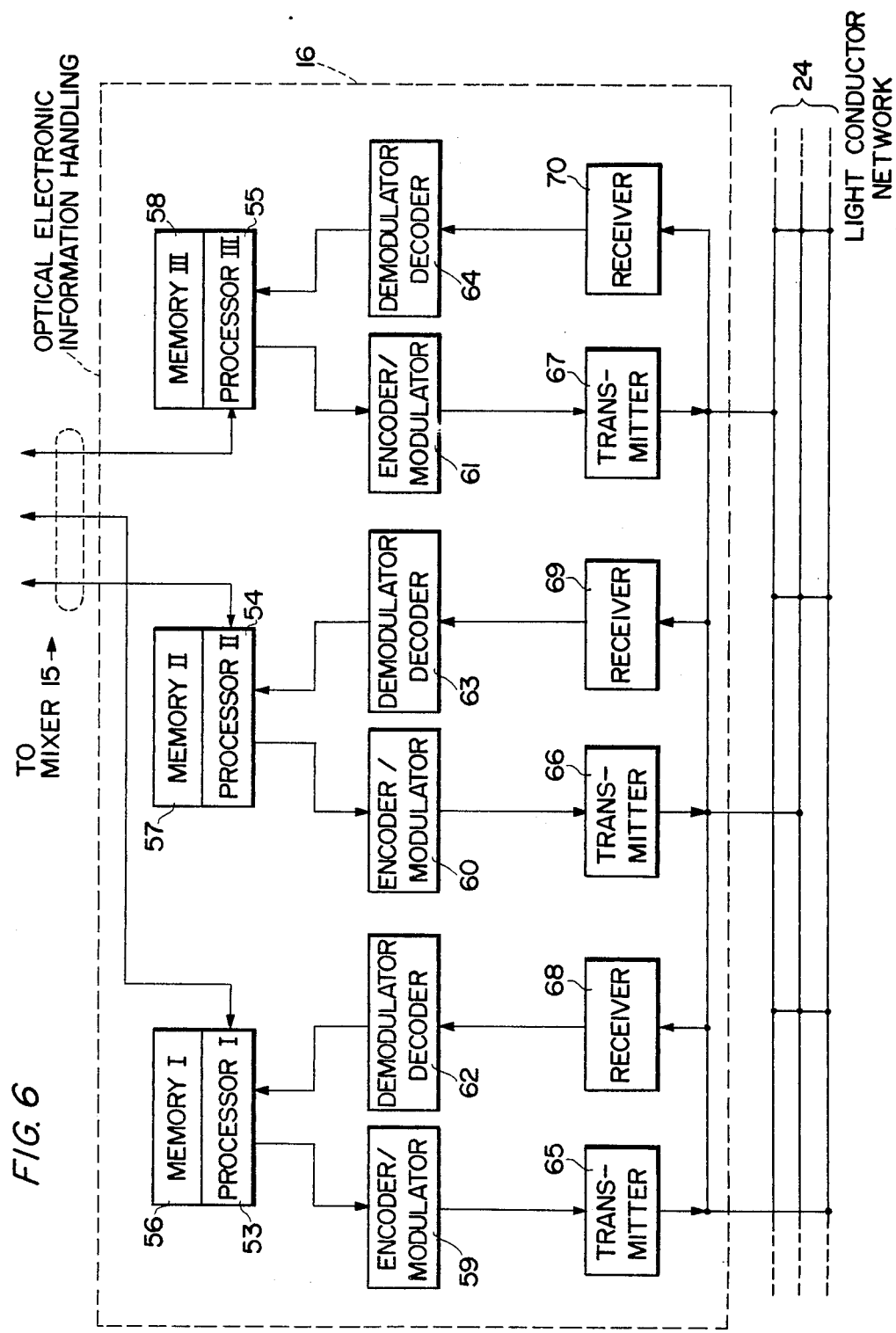
FIG. 6 is block circuit arrangement of an optical-electronical (optronical) informatin system.

FIG. 6 shows a block circuit diagram of an optronic information handling means located in signal processor 10 in triplicate as shown in FIG. 2 at 16, 17, and 18. Each of these means 16, 17, and 18 is constructed as shown in FIG. 6. Therefore, only one set of information handling means 16 will be described in more detail with reference to FIG. 6. Each means 16, 17, 18 comprises three processors 53, 54, and 55 each having its own memory 56, 57, and 58. Each processor is connected with its output to a respective encoder modulator 59, 60, 61. Each input of each processor is connected to the respective demodulator and decoder 62, 63, and 64. Each encoder modulator is connected with its output to a respective transmitter 65, 66, and 67. Each input of the demodulator decoders is connected to a respective receiver 68, 69, and 70. Each transmitter 65 to 67 comprises as a main component a laser diode which supplies a light signal into the input network 24. Each of the receivers comprises as a main component a silicon phototransistor operating as a detector for the light signals coming in on the network 24, whereby these light signals are transformed into electric signals.

The illustrated information handling means comprises three parallel circuit paths arranged in parallel to one another for increasing the reliability of the system. The operation will now be described with reference to the left-hand paths comprising the processor 53, the memory 56, the encoder modulator 59, the demodulator decoder 66, the transmitter 65, and the receiver 68. This circuit arrangement controls the data traffic taking place between the input network 24 and the mixer 15, whereby an oscillator forming an integral part of the processor 53 functions as a clock signal generator. An electrical signal coming from the mixer 15 to the processor 53 is supplied to the encoder modulator 59. Within the encoder portion the data telegram which at this point is referenced to the processor, is transformed into a word and address structure or telegram referenced to the peripheral equipment such as the various servo-units. Thereafter, the telegram passes through the modulator portion which impresses the telegram onto a high frequency carrier signal in the form of a frequency modulation. The corresponding pure data content is then recovered by demodulation in an intermediate step and imposed or superimposed on another fixed carrier by means of an amplitude modulation. The so produced signal is supplied to the laser diode of the transmitter 65 after the signal has been amplified. The laser diode supplies into the network 24 a diode current which is analog to the light signal. In the opposite direction the receiver 68 receives a light signal coming from the network 24 and retransforms the received light signal into an amplitude modulated electrical signal through the phototransistor forming part of each receiver 68. The so retransformed signal is supplied to the demodulator decoder 62. Thus, at the output of the demodulator decoder 62 there will now be present a data telegram referenced to the processor structure rather than to the peripheral structure so that this signal may now be further processed by the processor 53.

The two other paths of the system perform the same operations in the same sequence or under the same clock signal, whereby the synchronizing impulse is provided by the clock signal generator of the processor 53. If the processor 53 or rather its clock signal generator should fail, then the left-hand paths is automatically switched off and the next clock signal generator takes over or controls the necessary synchronization. However, normally the information means 17 and 18 also shown in FIG. 2 are synchronized by the clock signal generator of the processor 53. The respective synchronizing signal or impulses are supplied through the network 24.

Figure 7:
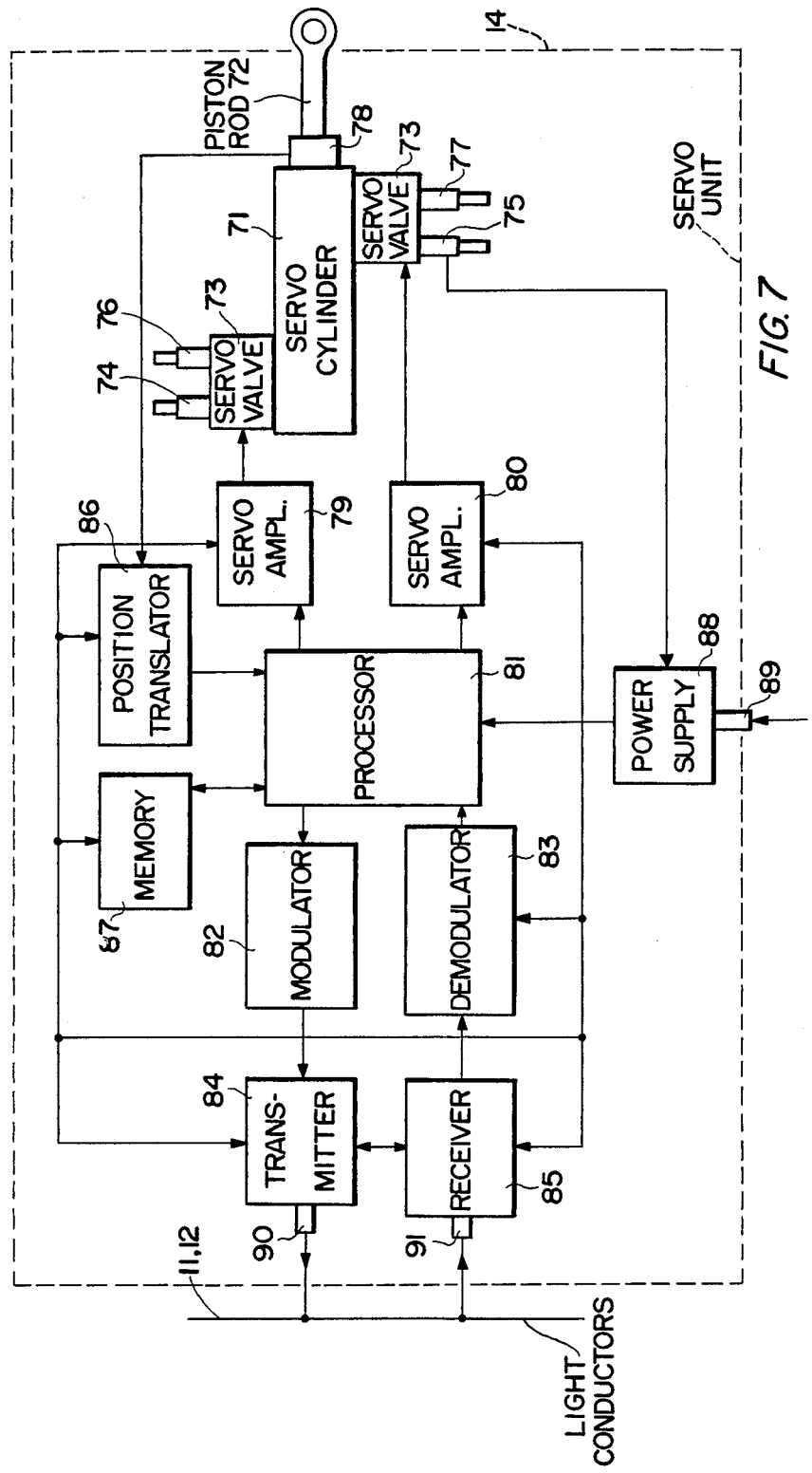
FIG. 7 illustrates a block circuit diagram of a servounit operating as a controlled unit.

FIG. 7 shows a block circuit diagram for a servo-unit 14, for example, for actuating the elevator assembly. The servo unit comprises a mechanical section shown on the right-hand side of FIG. 7 and an electronic portion shown on the left-hand side of FIG. 7. The mechanical portion comprises substantially an adjustment cylinder 71 for operating a piston rod 72 and two servo-valves 73. The electronic portion comprises two servo-amplifiers 79 and 80, a processor unit 81, a modulator 82, a demodulator 83, a transmitter 84, a receiver 85, a position transducer 86, for example, of an electromagnetic kind, a memory 87, and a power supply unit 88. The just mentioned units are electrically interconnected as shown.

The just mentioned functional units comprise primarily integrated circuits and are advantageously located in an 'electronic' chamber of the housing of the adjustment cylinder 71. Thus, the adjustment cylinder 71 incorporating the electronic portion forms a new integral servo-unit 14 which comprises the hydraulic pressure supply conduits 74, 75, and the return conduits 76, 77 as well as an input terminal 89 for the power supply and two light conductor terminals 90 and 91. A light signal addressed to the adjustment cylinder 71 and coming from the information means 16, 17, 18 through one of the light conductors 11 is received by the receiver 81 which transforms the light signal into a respective electrical signal and supplies the electrical signal to the demodulator 83. The demodulator 83 derives the original data telegram from this signal and supplies the derived signal into the processor unit 81 comprising an internal decoder. Such decoder transforms the telegram into its own interrogation cycle and supplies it to an internal data-bus.

Several possible operation programs of the adjustment cylinder 71 are stored in the memory 87. As a result of the telegram a certain program is recalled from the memory 87 for controlling the servo-amplifiers 79 and 80 which in turn cause an electrical control of the servo-valves 73. These valves 73 control the supply and return flow of the pressurized liquid in such a manner that the piston rod 72 imposes on the elevator assembly 1 a motion sequence which corresponds to the recalled program.

The memory 87 may be constructed as a semiconductor memory or as a magnetic bubble memory. The addressable programs are stored in the form of mathematical functions which permit the performing of rapid or slow elevator flap movements which also may be linear or nonlinear. Different control requirements may be satisfied by means of the stored functions. Thus, it is possible, for example, to adapt the rudder or flap excursions to the respective flight speed. Further, it is possible to store predetermined emergency programs, whereby the failure of important rudders may be compensated. Thus, it is, for example, conceivable to compensate the loss or failure of a wing flap or aileron 3 by causing nonsymmetrical elevator rudder excursions. Similarly, the loss or failure of a rudder assembly flap 2 may be compensated by moving the flaps or ailerons 3 and 4 or 3' and 4' in opposite directions and on that side of the craft which is the inside of the curve to be flown.

The invention provides further compensating possibilities. For example, a load imposed on only one of the wings by a wind gust or the like may be compensated by a rapid movement of a wing flap or aileron on one side or wing. For this purpose that wing flap or aileron is used which is closest to the point of load application. Such reaction operations may, for example, be caused by signals derived or sensed by conventional acceleration sensors arranged in the wings. The just described examples are by no means complete. These examples merely indicate which advantageous functions or effects may be caused with the arrangement according to the invention by using a respective programming.

Referring further to FIG. 7, the piston rod position sensor 78 provides a signal corresponding to the instantaneous piston rod position, to the position transducer or translator 86 which may be primarily an analog-to-digital converter. The signals provided by the position translator 86 are supplied to the processor unit 81. This unit 81 uses the mentioned signals from the position translator 86 for controlling the program that is to be executed. Further, corresponding data telegrams continuously arrive in the information means 16, 17, and 18 in accordance with the interrogation for thus controlling the operability of the servo-unit 14. These signals arrive through the transmitter 84 and the light conductors 11 and 12.

In the light of the above disclosure it will be appreciated that the memory 87 holds different actuation or operating programs to be performed by the adjusting cylinder 71 or, for example, to be performed by an electric servo-motor. The memory 87 serves simultaneously for the monitoring of these programs based on the signals provided by the position sensor 78. Memories of the type shown at 87 in FIG. 7 are well known in the art as so-called intelligent memories. The processing unit 81 may be of the type known as Intel 8080 manufactured by Intel Semiconductor GmbH 8000 München 2, Germany.

FIG. 8 illustrates a block circuit diagram of a display and operating unit 92 comprising a processor 93, an electronic image section 94, an image display screen 95, a keyboard 95a, an encoder 96, a transmitter 97, a decoder 98, and a receiver 99 operatively interconnected as shown in FIG. 8. The transmitter 97 and the receiver 99 are operatively connected through light conductors with the input network 20. Operating data are entered into the input network 20 by means of the alphanumeric keyboard 95a which may, for example, operate in accordance with the American Standard Code for Information Interchange (ASCI-Code). For certain fixed types of operations the respective instructions are entered by means of keys provided with corresponding symbols. Thus, the operator may select, for example, certain basic types of operations, such as manual operation (MANOP) semiautomatic operation (SEMOP) or automatic operation (AUTOP). In this connection the processor unit 93 has, among others, the function to process the signals provided by the keyboard 95a in such a manner that these signals are supplied to the mixer 15 in the form of interrogated data telegrams which are transmitted through the encoder 96 and the transmitter 97 through the respective light conductor. The image or display screen 95 is connected through the electronic image unit 94 to the processor unit 93. The image unit 94 comprises substantially a signal generator and a code translating or transforming matrix of the type conventionally used for an image display. A circuit arrangement of this type is dislosed in the book "Micro Computer Systems" by Klein, published by Francis Verlag, Munich, 1979, Second Edition, page 32. The image screen 95 is constructed as a semiconductor image screen and serves for the display of the actual attitude of the aircraft F as well as for the display of executed control corrections. The signal generator of the image unit 94 serves in this connection for processing the symbol type display of the attitude and course informations in the form of bars and course numbers for preparing alpha-numeric symbols in accordance with the above mentioned ASCI-Code and also for the processing of the symbols for the control instructions or telegrams. The code transforming or translating matrix controls the matrix fields or points of the image screen 95 so that the encoded digital signals provided by the signal generator are transformed or translated into the respective displays. The entire arrangement comprises three of the above described display and operating units 92 which correspond or communicate with the mixers 15 through the input network 20. Thus, each of the two pilots and the flight engineer is provided with his own display and operating unit 92. However, the respectively displayed informations and the executed operating steps will generally be completely different from each other due to the different functions to be performed by these three different operators. Here again the large capabilities or possibilities that may be executed by a respective programming of the disclosed circuit arrangement have been described only in their basic aspects.

FIG. 9 shows a block circuit diagram of a dialog apparatus 100 which provides a useful modification of the system according to the invention. The dialog apparatus 100 comprises substantially a speech or voice analysis section 101 connected to a microphone not shown, and a speech or voice synthesis section 102 connected to a loudspeaker not shown. The dialog apparatus 100 corresponds with the processor unit 93 of the display and operating unit 92 according to FIG. 8, whereby the operator may carry on a voice dialog with the described system. For this purpose the code words spoken into the microphone are recognized by the voice or speech analysis section 101. Such recognition is based on a store of syllables contained in the memory of the voice analysis section 101, whereby the operator's voice is transformed into respective digital telegrams which are supplied to the data processor 93. This operation is accomplished by means of a so-called PROM-voice decoder comprising a programmed read only memory. In the opposite direction it is now possible to supply important informations to the operator through the loudspeaker. For this purpose the speech or voice synthesis is performed by the section 102 comprising a PROM-voice encoder which encodes the telegrams supplied by the data processor 93. The section 102 further assembles the words to be voiced by the loudspeaker on the basis of a store of syllables contained in the memory of the section 102. The respective tone frequency signals are supplied to the loudspeaker through a power amplifier not shown, but connected on the loudspeaker and the voice synthesis 102. Such voice encoders and decoders are known as such, for example, from the magazine [Electronic], Volumne 14, 1980, starting at the page 54, where examples of use for such decoders are described.

The above described system achieves a substantially increased reliability due to the combined use of the following features according to the invention, namely the use of light conductor techniques, digital techniques including the use of microprocessors, and the automatic recognition of defects and their removal by means of logic circuit arrangements. If in this system a power supply of conventional construction would be used, the increased reliability would again be substantially reduced. Thus, the invention aims at providing an energy supply which has a reliability comparable to that of all the other component sections of the present system.

Figure 10:
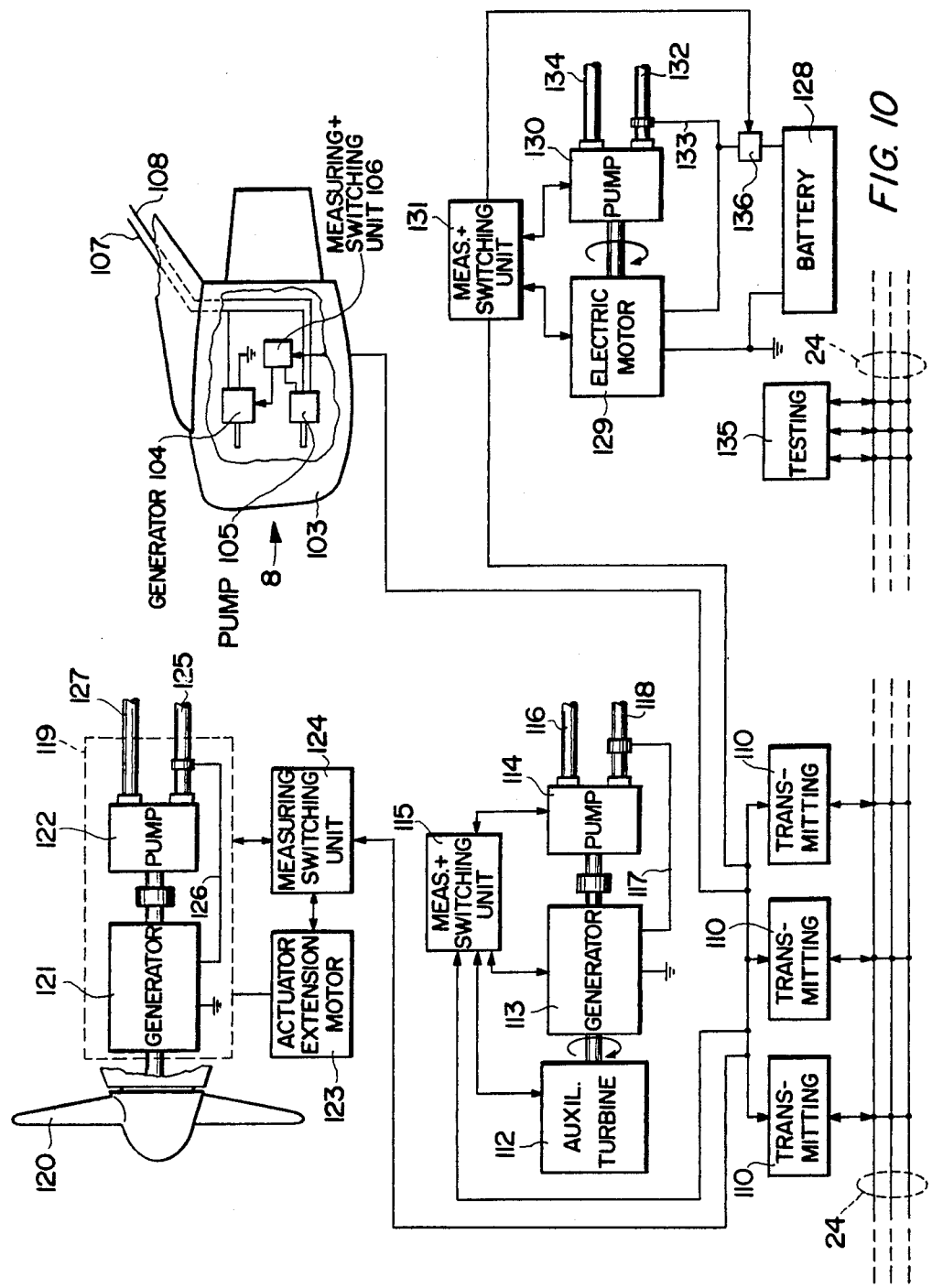
FIG. 10 is a circuit diagram of the power supply system according to the invention.

FIG. 10 accordingly shows a block circuit diagram of such a power supply system. Thus, it becomes possible to power the airborne components for transmitting the control signals from four different energy sources. One source of power is derived from an aircraft propulsion plant 8. Another source of power is derived from an auxiliary turbine 112. Yet another source of power is provided by the electrical battery 128. A fourth source of power is provided by a so-called slip stream turbine 120. Within the propulsion plant nacelle 103 there is arranged an electrical generator 104 and a hydraulic pump 105 coupled to each other by the shaft of the propulsion plant. The hydraulic supply of the servo-units 14.09 or 14.10 is accomplished through a pressure supply conduit 107 and a return conduit 108. The electrical output of the generators 104 is connected with the pressure conduit 107 in such a manner that the metal pipe of this conduit functions simultaneously as an electrical energy conductor. The electrical counterpole of the generator output is connected to the mass of the system. A measuring and switching unit 106 is connected on the one hand to the generator 104 and to the pump 105 and on the other hand through three transmission means 110 to the network 24. The transmission units 110 are connected in parallel to one another. An auxiliary turbine 112 is connected to a further electrical generator 113 and to a further hydraulic pump 114. The output of the generator 113 is connected to the pressure supply conduit 118 through the conductor 117 so that here again the pressure conduit 118 simultaneously functions as an electrical energy conductor. The return flow of the hydraulic liquid takes place through the conduit 116. The electrical return flow takes place through the common mass connection.

A measuring and switching unit 115 is connected on the one hand with the auxiliary turbine 112, the generator 113, and with the pump 114. On the other hand, the measuring and switching unit 115 is connected through the transmission units 110 with the network 24. The airborne battery 128 provides a further source of energy. The battery 128 may energize an electrical motor 129 operatively connected to a hydraulic pump 130. A battery conductor 133 is connected in such a manner with the pressure supply conduit 132 that the latter again functions simultaneously as an electrical energy conductor. The electrical return flow takes place through the mass of the system. The conduit 134 functions as a hydraulic return flow.

A further measuring and switching unit 131 is connected on the one hand with the electrical motor 129, with the pump 130, and with a switch 136. On the other hand, the unit 131 is connected to the transmission means 110 and thus to the network 24. A further source of energy is provided by the slip wind turbine 120 which may be moved into the slip wind outside the outer skin of the aircraft by means of an extension motor 123 which also extends the power unit 119 comprising substantially an electrical generator 121 driven by the slip wind turbine 120 and in turn driving a hydraulic pump 122. The output conductor 126 of the generator is connected to the pipe of the pressure conduit 125 so that the latter functions simultaneously as an electrical energy conductor. The hydraulic return flow takes place through a conduit 127. The electrical return flow takes place through the mass of the system.

A testing unit 135 which may be arranged in any convenient location within the aircraft is operatively connected to the fiber optic input network 24 so that the testing unit 135 may correspond or communicate with the above mentioned measuring and switching units. Normally, when the system operates trouble-free, the electric and hydraulic energy is supplied by the generator 104 arranged in the propulsion plant nacelle 103 and by the pump 105. During such normal operation the testing unit 135 continuously interrogates the operational status by checking such typical operational data of the generator and the pump as the voltage, the temperature, the pressure, and so forth. These data are ascertained by means of the measuring and switching unit 106 which is addressed by respective digital telegrams from the testing unit 135. The testing unit 135 is equipped with rated or predetermined values stored in a memory of the testing unit 35 thus enabling the latter to compare the measured values with the stored predetermined or rated values.

If the propulsion plant fails, the testing unit 135 immediately recognizes this condition, whereby the next energy source is switched on, for example, the auxiliary turbine 112 may be switched on in accordance with a stored priority list. The corresponding digital light signal addressed to the measuring and switching unit 150 is supplied to the transmission unit 110 through the network 24. The transmission unit transforms or translates the optical signal into an electrical signal which is also identified and due to its correct address, it is passed on to the measuring and switching unit 115. Due to the received instruction or instruction telegram, the measuring and switching unit 115 switches on the auxiliary turbine 112 and provides in response to a respective interrogation the corresponding operational data back to the testing unit 135. If the auxiliary turbine 112 should fail to operate the testing unit 135 immediately recognizes this condition, whereupon the slip wind turbine 120 is switched on, again in accordance with a stored priority sequence which designates the slip wind turbine 120 as the next following source of energy. Again, the respective signals emanating from the testing unit 135 reach the measuring and switching unit 124 through the network 24 and the transmission unit 110. As a result, the measuring and switching unit 124 triggers the required switching operations. Should the slip wind turbine 120 fail, then the battery 128 is placed in service as an energy source. Due to the relatively high power requirements, for example, by the control or servo-units, the supply of energy to the vital systems of the aircraft can be assured by the battery only for a short duration. However, it is to be noted that the minutes thus gained may be crucial or decisive. In such a system it is naturally necessary to transform the battery voltage of, for example 28 volts direct current, to the conventional 115 volts/400 Hz of the on-board network. This may be accomplished by means of a conventional chopper converter. Where the aircraft is equipped with several propulsion plants, each of these plants would be provided with an electrical generator and pump as described. Thus, if, for example, the propulsion plant 8 should fail, the other propulsion plant 8' shown in FIG. 1 would be first used for maintaining the necessary power supply prior to using the auxiliary turbine 112.

Figure 11:
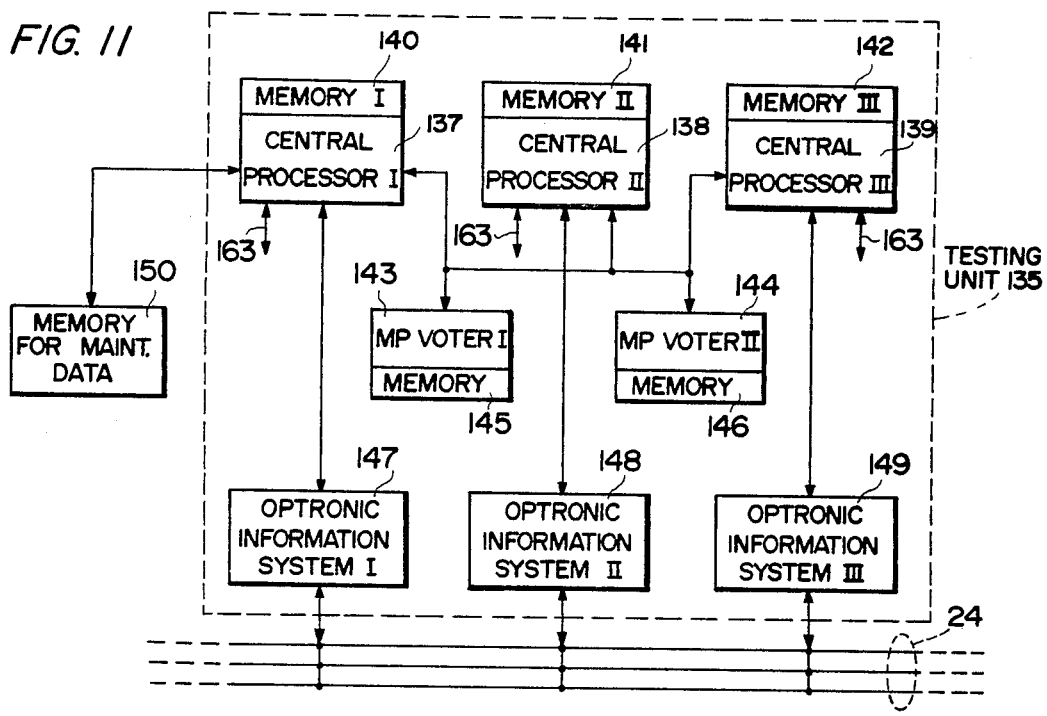
FIG. 11 shows a block circuit diagram of the internal components of a testing circuit employed in FIG. 10.

FIG. 11 shows an internal block circuit diagram of the testing unit 135 as illustrated in FIG. 10. The testing unit 135 comprises substantially three central data processing devices 137, 138 and 139, each having its own memory 140, 141, and 142 operatively connected thereto. Each central data processor 137, 138, and 139 is connected through an optronic information handling means 147, 148, and 149 with the network 24. Two so-called MP voters (micro-processor voter) 145 and 146 are operatively connected to the data processors 137, 138, and 139 by means of the common data conductor or bus 151. An external memory 150 provides maintenance data and may, for example, be connected to the data processor 137. Since the optronic information handling means 147, 148, and 149 are connected to the network 24, it is possible for the testing unit 135 to enter into a data exchange with practically all functional units of the entire system if these units are connected to the network 24.

The testing unit 135 operates as follows. The three data processors 137, 138, and 139 are monitored by the two MP-voters 143, 144, whereby the MP-voter 143 normally cooperates with the data processor 137, thereby acting as an interrogation sequence determining circuit. If the MP-voter 143 receives interrogation clock signals of the same duration from all data processors 137, 138, 139, then the testing result is in good order. However, if an interrogation clock pulse of any one of the data processors should not coincide with the respective pulses from the other processors, the respective processor is switched off by the two MP-voters 143, 144. The MP-voters 143, 144, thus test each other with regard to having the same information status. If in this test a discrepancy should occur, the further testing of the MP-voters in sequence is taken over by one of the data processors 137, 138, or 139 until it is recognized which of the two MP-voters must be switched off because it is defective. Thus, it is assured that the internal reliability of the testing unit 135 is higher than the reliability of the individual components to be tested by the testing unit 135.

The testing unit 135 interrogates each of the individual functional units of the energy or power supply system by addressing each of these units by means of the corresponding key address. The interrogated unit emits a data telegram addressed to the testing unit 135 in response to said interrogation. This data telegram contains the ascertained operational data of the respective unit in an encoded form and these data also contain the address of the unit being tested. The thus ascertained data are then compared in the testing unit 135 with predetermined or rated values stored in the memories 140, 141, 142. This comparing takes place in accordance with an analysis program. By means of such a program it is ascertained whether the respective interrogated unit functions properly or whether it is defective. If the tested unit is defective, it will be switched off by the testing unit 135 and another unit will be switched on to take over the function of the defective unit, whereby the selection of the next unit takes place in accordance with a priority list also stored in the memory. The respective switching instructions are supplied in form of addressed digital optical telegrams transmitted to the respective units. During this operation the traffic of data entering and leaving the testing unit 135 is controlled by the optronic information handling systems 147, 148, 149 in accordance with a predetermined clock sequence. The instruction or interrogation telegrams are thus provided with the respective addresses by these data handling means 147, 148, 149.

Figure 12:
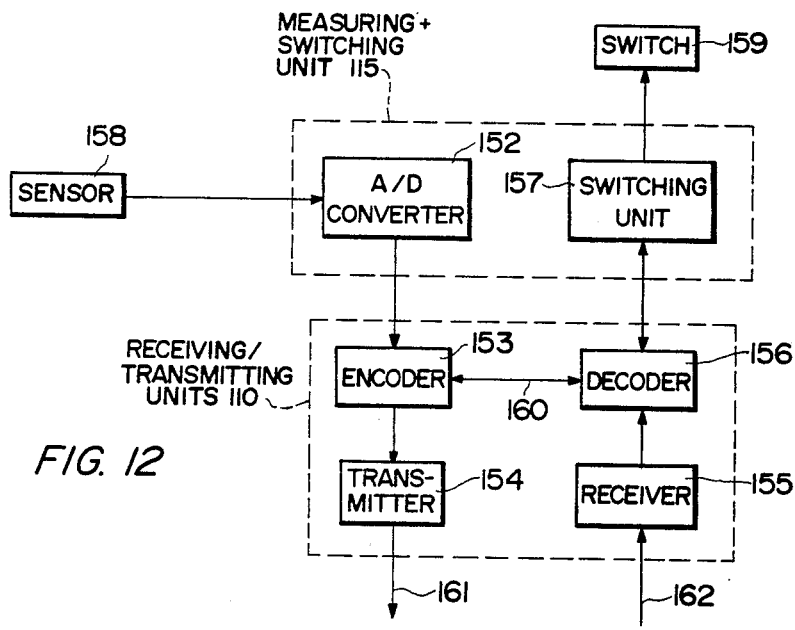
FIG. 12 is a block circuit diagram of the internal components of a measuring and switching unit and including a transmission unit employed in FIG. 10.

FIG. 12 shows an internal block circuit diagram of one of the measuring and switching units such as shown at 115 in FIG. 10. The unit 115 comprises substantially an analog to digital converter 152 and a switching unit 157. The transmission unit 110 is also known in this context with its internal circuit arrangement. The transmission unit 110 comprises substantially an encoder 153 and a transmitter 154 as well as a receiver 155 and a decoder 156 operatively interconnected as shown. The function of the measuring and switching unit 115 will now be described by way of example with reference to the auxiliary turbine 112. If the auxiliary turbine 112 is operating, a sensor 158 measures, for example, the output voltage of the generator 113 in the form of a respective analog signal which is then supplied to the AD converter 152. The AD converter 152 provides a respective digital signal which in turn is supplied to the encoder 153. The encoder 153 provides this signal with the address of the testing unit 135 and transmits the telegram which is now complete in its content, to the transmitter 154. The cross connection 160 makes certain that the telegram is supplied only to the transmitter 154 if a correspondingly addressed interrogation telegram from the testing unit 135 has been received through the receiver 155 and the decoder 156. The transmitter 154 and the receiver 155 are connected to the network 24 through the light conductor 161 and 162 and the respective telegrams are exchanged in the form of digital light signals.

Additional sensors may be employed for measuring other values for supply to the testing unit 135. For example, the turbine r.p.m., the generator current, the hydraulic pressure and so forth may thus be measured and checked by the testing unit 135.

If the testing unit 135 ascertains a defect in the auxiliary turbine 112, a telegram addressed to the switching unit 157 is received by the receiver 155 through the network 24. The telegram contains the switch-off instruction which is recognized by the decoder 156 which reads the instruction and transmits a respective signal to the switching unit 157. Depending on the content of the telegram, the switching unit 157 causes the switching off of all defective connections between the aircraft and the auxiliary turbine 112, whereby only those connections are interrupted which require interruption for safety reasons. Similarly, the connections between the aircraft and the generator 113 and the pump 114 are disconnected. For this purpose a switch 159 may be provided, for example, to switch-off the generator 113.

FIG. 13 illustrates a network analyzer 163 operatively connected to a portion of the fiber optical network 20 or 24. The network analyzer 163 comprises a large number of fiber optical outputs 164 as well as a large number of fiber optical inputs 165. A knot or rather joint 168 in a light conductor 167 to be tested is connected with a fiber optical output 164 through a testing conductor 166 for testing the light conductor 167. Additionally, a knot or joint 169 is connected with one of the fiber optical inputs 165 through a further testing conductor 170. Thus, it is possible to ascertain by means of a light signal introduced into the joint from the network analyser 163 whether the light caught in the joint and passed on through the testing conductor 170 into the network analyser represents a properly functioning or a defective light conductor 167. For this purpose it is necessary that the network has a very low damping relative to the operating signals passing therethrough and that it provides a very high damping relative to the testing signals. This is necessary in order to provide a clearly measurable damping in each light conductor operatively interposed between adjacent knots or joints. Thus, it is possible to disregard any disturbing influence that may be present in secondary light paths leading through other joints. To achieve a different damping for the operational signals and for the testing signals in the network 24, it is, for example, possible that the two types of signals have different colors. For example, the operational signals may have a red color and the testing signals may have a green color. If necessary, the color dependency of the network damping may be increased by a respective coloring of the material of which the light conductors are made.

FIG. 14 shows an internal block circuit diagram of the network analyser 163 according to FIG. 13. The network analyser 163 comprises primarily the microprocessor 171 which is connected to the fiber optical network 24 in two ways. On the one hand, the connection between the micro-processor 171 and the network 24 is provided by the modulator 172, the transmitter circuit 173 and the transmitter 174. On the other hand, the connection is provided by the demodulator 175 and a receiver circuit 176, as well as the receiver 177. Between the transmitter circuit 173 and the receiver circuit 176 there is provided a cross conductor which is also connected to the micro-processor 171. The transmitter 174 comprises a number of fiber optical outputs which correspond to the number of joints or knots connected to the transmitter 174. Each output of the transmitter is provided with a laser diode which emits green light, for example. The receiver 177 is accordingly equipped with fiber optical inputs corresponding in number to the joints or knots connected to the receiver. The receiving elements proper are photodiodes or phototransistors which are operational only in the color range of the testing signals. In order to test the fiber optical network 24 under the control of the microprocessor 171, a predetermined laser diode in the transmitter circuit 173 is switched on and the light of this laser diode is modulated with a constant frequency in an amplitude modulating mode. The modulated diode current is provided by the modulator 172 accordingly. The respective light signal is supplied to the junction or joint 168 in the network 24 which joint is connected with the respective laser diode, please see FIG. 13.

Simultaneously that receiving element in the form of a light sensitive diode or transistor is connected to the demodulator 175 through the receiving circuit 176, which at that instant relates or corresponds to the light conductor 167 of the network 24 to be tested. Thus, the receiving element transforms the light signal into a corresponding electrical current. The demodulator 175 extracts the modulation signal from said electrical current and supplies the signal to an analog-to-digital converter not shown. The analog-to-digital converter supplies a digital signal corresponding to the voltage of the signal to the microprocessor 171. The micro-processor 171 stores the voltage value which has been measured for the respective branch such as the light conductor 167 of the network 24 and compares the measured value with a rated value which has also been stored for this branch 167. Since the testing light signal and the modulation are maintained constant in their amplitude, differences between the rated and measured values can occur only if the tested branch or branches of the network 24 are defective. The micro-processor 171 controls all switching operations to be performed by the transmitter circuit 173 and by the receiver circuit 176. Thus, the micro-processor 171 determines, in accordance with an internal program, the individual testing circuits for all branches of the network 24. The micro-processor 171 transmits or passes on the data corresponding to the instantaneous condition of the network 24 to one of the data processing units of the testing device 135. In order to increase the reliability, it is possible to operate all three of the above described network analysers 163 in a parallel circuit arrangement. For this purpose the respective connecting terminal corresponding to the terminal 178 of the micro-processor 171 is to be connected to the processing means 137, 138, 139 of the testing device 135. As a practical or suitable manner, the network analyser is constructed as an internal component of the testing device 135.

It will be appreciated that in the above described system the light signals exchanged between the intermeshed networks 20 and 24 are not limited to the described types of modulations. Rather, it is possible to employ, depending on the type of use, other types of modulations, such as pulse frequency modulation (PFM), or pulse code modulation (PCM).

The monitoring and control according to the invention by means of a testing device 135 which corresponds or communicates in a digital manner with the measuring and switching units 115, 131, 124, is not limited to the illustrated example of an energy supply system. Rather, the monitoring and control according to the invention may be extended in the case of an aircraft having a system for transmitting of control signals, to all peripheral units of this system. The extension of the monitoring and control has particularly the advantage, for example, in connection with the failure of a rudder to continue the operation in accordance with emergency programs stored in the memory of the testing device 135 and developed for the particular type of emergency involved.

A particular advantage of the invention is seen in that it may be used for all plants and systems in which an extremely high reliability is required. Thus, the invention is not limited to the use in an aircraft, but may, for example, be used in the controls of spacecraft, process control systems in nuclear power plants, power supply systems for hospitals, especially operating rooms, and intensive care stations and so forth.

In order to complete the disclosure of the preceding specification, the following additional items of information are supplied with respect to some devices as mentioned in the specification and in the claims, as well as illustrated in the accompanying Figures.

1. Devices 41 and 44

According to FIG. 5 the mixer 15 consists essentially of the central processor/memory 41/44, 42/45 and 43/45. A unit doing the respective processor - memory-operations according to the description is known as athe digital unit PDP11/70, produced by Messrs. Digital Equipment GmbH, 8000 München 40, Germany.

2. Devices 53 and 56

According to FIG. 6 the information system consists essentially of the central processor/memory 53/56, 54/57 and 55/58. A unit doing the respective processor-memory-operations according to the description is known as the digital unit TMS9900, produced by Messrs. Texas Instruments GmbH, 8050 Freising, Germany.

3. Devices 81 and 87

According to FIG. 7 the processor 81 and the memory 87 are parts of the servo unit 14. A unit doing the respective processor-memory-operations according to the description is known as the digital unit INTEL 8086, produced by Messrs. Intel Semiconductor GmbH, 8000 München 2, Germany.

4. Devices 93 and 95a

A digital unit doing the operations of data processor 93 and operating unit 95a is known by the type TI99/4 produced by Messrs. Texas Instruments GmbH, 8050 Freising, Germany.

5. Devices 94 and 95

A digital unit doing the operations of electronic image unit 94 and image screen 95 as shown in FIG. 8 is known as the digital image unit BGC 370 produced by Messrs. Texas Instruments GmbH, 8050 Freising, Germany.

6. Devices 137 and 140

According to FIG. 11 the testing unit 135 consists essentially of the processor/memory 137/140, 138/141 and 139/142. A unit doing the respective processor-memory-operations according to the description is the aforementioned digital unit PDP11/70.

7. Devices 143 and 145

The microprocessor (MP) voter/memory 143/145 and 144/146 are other essential parts of the testing unit 135. A unit doing the respective voter-memory-operations according to the description is the aforementioned digital unit TMS 9900.

8. Device 171

According to FIG. 14 the micro processor 171 is the essential part of the network analyser 163. A unit doing the respective operations according to the specification is the aforementioned digital unit TMS 9900.

9. Devices 47, 48, 49

According to FIG. 5 the vertical references 47, 48 and 49 are essential parts of the Mixer 15. A vertical reference usable according to the invention is known by the type VG 14, produced by Messrs. Sperry Flight Systems Division, Phoenix, Ariz. 80052, USA.

10. Devices 50, 51, 52

According to FIG. 5 the horizontal references 50, 51, and 52 are essential parts of the Mixer 15 too. A horizontal reference usable according to the invention is known by the type C 14 produced by Messrs. Sperry Flight Systems Division, Pheonix, Ariz. 85002 USA.

11. Devices 59, 60, 61

According to FIG. 6 the encoder/modulators 59, 60 and 61 are essential parts of the information system 16. An Elekro-Optical Modulator, usuable according to the invention has been described in "Elektronik" 1980, No-25, page 11.

12. Devices 65, 66, 67

A so called "V-Nut Laser", produced by Messrs. AEG Telefunken, Gernany, as described in "Elektronik" 1980, No. 15, page 37, would be usable as a transmitter 65, 66 and 67 according to FIG. 6.

13. Devices 68, 69, 70

A so called PIN-Diode, described in "Elektronik" 1980, No. 15, page 39, would be usable as a receiver 68, 69 and 70 according to FIG. 6.

14. Device 11 and 12

The longitudinal light conductors 11 and the cross light conductors 12 according to FIG. 2 could be of the "Gradient Type Fiber", produced by Messrs. AEG Telefunken, Germany. These fibers have been described in "Elektronik" 1980, No. 15, page 37.

Although the invention has been described with reference to specific example embodiments, it will be appreciated, that it is intended to cover all modifications and equivalents within the scope of the appended claims.

What is claimed is:

1. In a system for transmitting control signals from a control source providing controlling signals to controlled units through signal light conductor network means operatively interconnecting said control source and said controlled units, wherein a number of light conductors form redundant connection paths between said control source and said controlled units, the improvement comprising a first plurality of longitudinal light conductors and a further plurality of cross light conductors repeatedly intermeshing said longitudinal light conductors for forming said light conductor network means with a multitude of passive closed circuit paths intermeshed with one another so that controlling signals can pass from said control source to a controlled unit even if some of these circuit paths should fail, said control source comprising means for producing said controlling signals in the form of digital light signals, signal processor means (10) including signal mixing means (15) and information processing means (16, 17, 18) operatively connected to said light conductor network means for addressing and actuating said controlled units.

2. The system of claim 1, wherein said controlled units comprise controlled surfaces (1, 2, 3, 4, 5) and servo-units operatively connected to said controlled surfaces and to said signal conductor network means, said servo-units (14) comprising intelligent memories (87) and processing units (8) for controlling and actuating said controlled surfaces.

3. The system of claim 1, wherein said controlled units comprise servo-units including position sensing and transducing means (78), and addressing means operatively connected to said position sensing and transducing means for providing a positional signal representing an instantaneous position of a controlled member.

4. The system of claim 1, wherein said signal conductor network means comprise a first network (20) of multiply intermeshed light conductors operatively interposed between said control source (9) and said mixing means of said signal processor means (10), and a second network (24) of multiply intermeshed light conductors operatively interposed between said signal processor means (10) and said controlled units (14).

5. The system of claim 1, wherein said control source (9) comprise a movable component, optronic means for sensing an instantaneous position, said optronic means comprising a movable member (29) and a stationary member (25a) arranged relative to the movable member to form a gap between the members, light emitting means operatively arranged on one of said members (30) for emitting a light signal, and light sensing means (26) arranged on the other of said members and for receiving a light signal emitted by said light emitting means, whereby the produced light signal represents the instantaneous position of said movable component of said control source.

6. The system of claim 1, wherein said control source (9) comprises electrical simulator means (37) including an addressable force or power simulator (35) having an electric motor (38) with a stator and with a rotor including a shaft, said control source further comprising a movable control stick and stationary mounting means for mounting said control stick, and stator being rigidly connected to said control stick mounting means, said shaft being rigidly connected to said control stick.

7. The system of claim 1, further comprising at least one display and operating device (92) including an image display screen (95) and an operating keyboard (95a), said device (92) being operatively connected to said mixing means through said light conductor network.

8. The system of claim 7, further comprising dialog means (100) operatively connected to said display and operating device (92), said analog means comprising a first section (101) for analyzing speech and a second section (102) for synthesizing speech.

9. The system of claim 1, wherein each of said information processing means comprise at least one memory (56) for storing information data, processor means (53) for processing information data, encoder means for encoding information representing signals, modulator means for modulating said signals, demodulating means for demodulating modulated signals, decoder means for decoding encoded signals, and a receiver for receiving information bearing signals.

10. The system of claim 4, wherein said light conductors of said first network (20) and said light conductors of said second network are provided in triplicate sets operatively connected in parallel to one another, said signal processor means including said signal mixing means and said information processing means also being provided in triplicate and connected in parallel to one another.

11. The system of claim 1, further comprising redundant power supply means (8, 112, 120, 128) operatively connected to said conductor means, said power supply means comprising measuring and switching means (106, 115, 124, 131), triplicate transmission means (110) connected in parallel for operatively connecting said measuring and switching means (106, 115, 124, 131) to said network means, and testing means (135) operatively connected to said network means and thus to said measuring and switching means.

12. The system of claim 11, wherein said power supply means comprise an aircraft propulsion plant (8), an auxiliary turbine (112), a slip wind turbine (120) and an electric battery (128).

13. The system of claim 10 or 11, wherein each of said transmission means comprises an encoder (153), a decoder (156), means (160) interconnecting said encoder and decoder, transmitter means (154) connected to said encoder means, and receiver means connected to said decoder means.

14. the system of claim 11, wherein said measuring and switching means (106, 115, 124, 131) comprise sensor means (158) for sensing an operating status or condition of a controlled unit, analog-to-digital converter means (152) operatively connected to said sensor means for converting a status representing analog signal into a digital signal, said measuring and swithcing means further comprising switching members (157, 159) connected to said transmission means (110) and to a controlled unit for switching off such controlled unit in response to malfunction of the controlled unit, whereby the measuring and switching means cooperate with the transmission means (110).

15. the system of claim 11, wherein said testing means (135) comprise three optronic information handling or processing means (147, 148, 149) operatively connected to said network means for receiving and transmitting information from and to the network means, three data processors (137, 138, 139) operatively connected to the respective information processing means for receiving and transmitting data, each of said data processors having its own memory means (140, 141, 142) for storing data therein, and two micro-processor voter means (143, 144) operatively connected to each of said three data processors for monitoring and sequencing the operation of said three data processors.

16. The system of claim 15, wherein said testing means further comprise external memory means (150) for storing maintenance data, said external memory means being operatively connected to any one of said three data processors.

17. The system of claim 15, further comprising at least one network analysing means (163) operatively connectable to said testing means for analysing the operational status of said network means.

18. The system of claim 15, comprising three network analysing means (163) each of which is operatively connected to its respective data processor (137, 138, 139) of said testing means.

19. The system of claim 17 or 18, wherein said network analysing means comprise operating means capable of handling colored analysing light signals the color of which differs from that of any colored operating light signal.

20. The system of claim 11, wherein said testing unit (135) is operatively connected to the system for monitoring and controlling any component of the system.

21. The system of claims 1 or 4, wherein said light conductors comprise fiber optical conductors which are made of a colored material.

* * * * *

UNITED STATES PATENT AND TRADEMARK OFFICE
CERTIFICATE OF CORRECTION

PATENT NO. : 4,422,180
DATED : December 20, 1983
INVENTOR(S) : Hans Joachim Wendt It is certified that error appears in the above-identified patent and that said Letters Patent is hereby corrected as shown below:

In [73] the Assignee's name should read:
   --Messerschmitt-Boelkow-Blohm Gesellschaft mit beschraenkter Haftung--.

In the Abstract, line 17, "are" should be --as--.

In Claim 8, Column 20, line 68 "analog" should be --dialog--.

In Claim 14, Column 21, line 40 "the" should be --The--;
   Column 22, line 1 "swithcing" should be --switching--.

In Claim 15, Column 22, line 8, "the" should be --The--.

Signed and Sealed this

Thirteenth Day of March 1984

[SEAL]

Attest:

GERALD J. MOSSINGHOFF

Attesting Officer

Commissioner of Patents and Trademarks